Feb. 8, 1966  E. CHUSID ET AL  3,233,912
CHECKING SYSTEM AND PORTABLE CART THEREFOR
Original Filed March 12, 1959  2 Sheets-Sheet 1
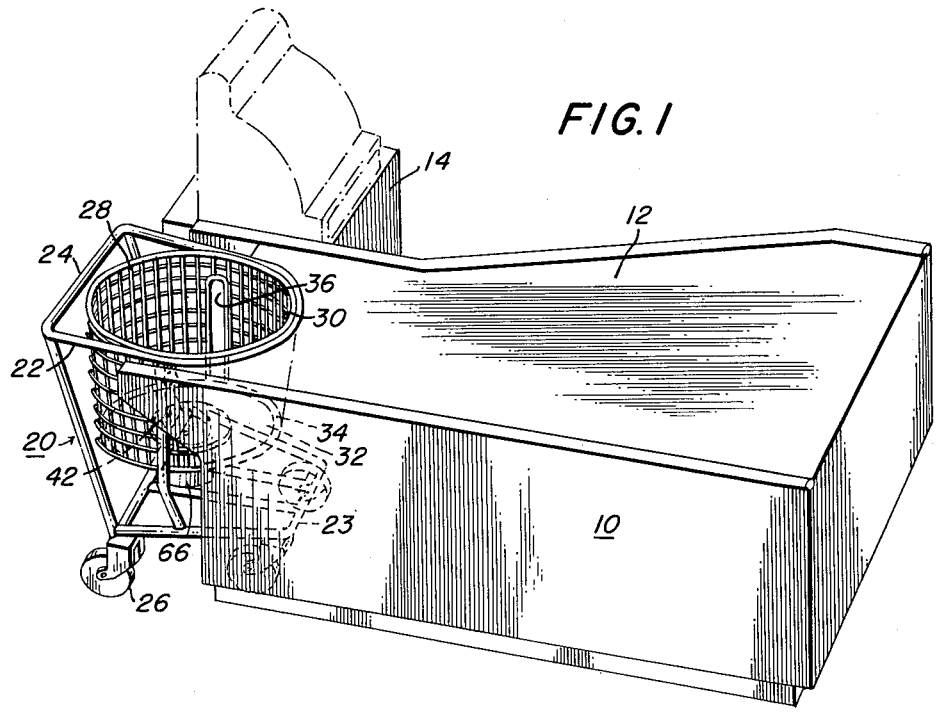
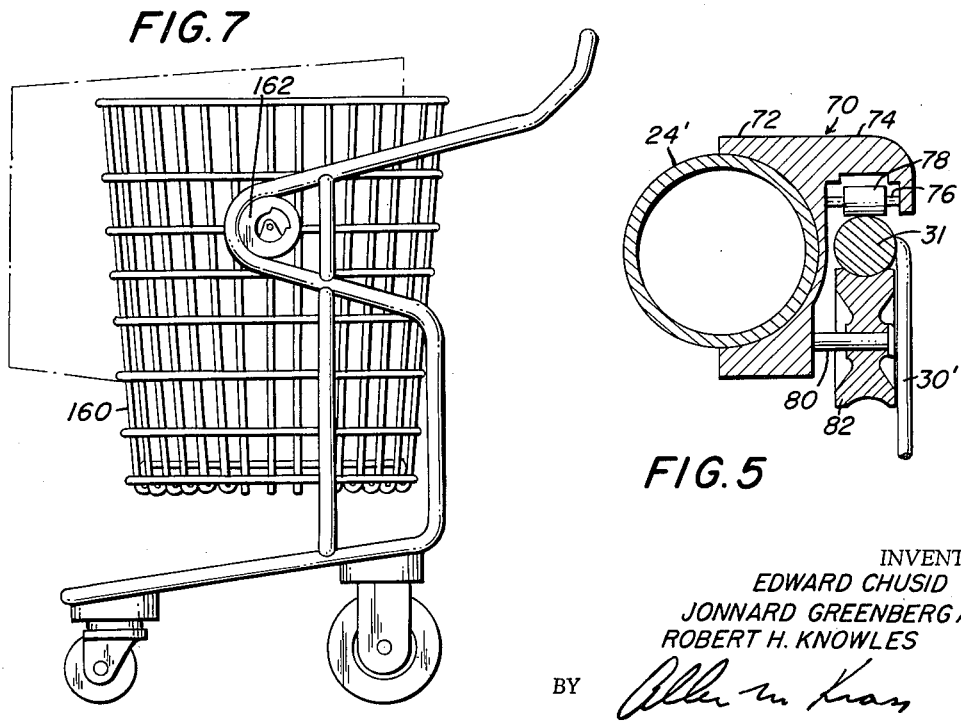
INVENTORS
EDWARD CHUSID
JONNARD GREENBERG AND
ROBERT H. KNOWLES
BY
ATTORNEY Feb. 8, 1966  E. CHUSID ET AL  3,233,912
CHECKING SYSTEM AND PORTABLE CART THEREFOR
Original Filed March 12, 1959  2 Sheets-Sheet 2

INVENTORS
EDWARD CHUSID
JONNARD GREENBERG AND
ROBERT H. KNOWLES

BY

ATTORNEY

United States Patent Office 3,233,912
Patented Feb. 8, 1966

3,233,912
CHECKING SYSTEM AND PORTABLE
CART THEREFOR
Edward Chusid, 19342 Washburn Ave., Detroit, Mich.;
Jonnard Greenberg, 23880 Norwood Ave., Oak Park,
Mich.; and Robert H. Knowles, 31999 Rocky Crest
Drive, Farmington, Mich.
Original application Mar. 12, 1959, Ser. No. 798,962, now
Patent No. 3,076,527, dated Feb. 5, 1963. Divided
and this application May 16, 1962, Ser. No. 204,023
4 Claims. (Cl. 280—33.99)

This application is a division of our copending application, Serial No. 798,962, filed March 12, 1959, now Patent No. 3,076,527 issued February 5, 1963.

The present invention relates to a checking system and to a portable cart particularly useful therefor. The invention is specially useful in large self-service retail operations, such as food markets where the customers select the articles of merchandise desired to be purchased, load them into a portable cart, and transport them to the check stand or counter where the checker, usually the cashier, lists the articles in the cash register.

An object of the invention is to provide a novel cart constructed in a manner so that its article-carrying basket, or parts thereof, may be actuated under control of an operator so that it moves the articles contained therein to a position permitting more convenient and efficient removal from the basket.

A further object of the invention is to provide a novel cart which is constructed in a manner that will permit each cart to nest in another cart of like construction during non-use.

In accordance with the invention, there is provided a check counter or stand and a portable cart. The portable cart includes a wheeled frame structure and a basket supported thereby for carrying the articles of merchandise, which basket includes a preferably cylindrical side wall, a preferably circular bottom wall and an open top, the bottom wall being supported to permit relative vertical movement thereof with respect to the side wall in a direction bringing the bottom wall towards and away from the open top.

According to the other aspects of the invention, the bottom wall of the basket is also supported to permit relative horizontal rotational movement thereof with respect to the cart frame structure. The rotational movement of the bottom wall may cause only the bottom wall to move with respect to the cart frame structure or may cause the whole basket to rotate as a unit with respect to the frame structure. A number of arrangements are disclosed. In any event, the articles of merchandise carried in the basket may thereby be successively positioned within a relatively narrow area of reach, so that the customer need only wheel his cart to a specific position with respect to the counter, whereupon the cashier will be able to speedily and efficiently unload the cart as she checks each item and lists it in the cash register.

Other aspects of the invention pertain to the cart structure to enable each cart to be nested or telescoped into the other carts of like structure so that during their non-use they will occupy a minimum of floor space.

Still other features and advantages of the invention will become apparent by reference to the following description of several preferred embodiments constructed in accordance with the invention.

In the drawings:

FIG. 1 is a perspective view of the checking system illustrating the check counter and portable cart in proper position with respect thereto;

FIG. 5 is an enlarged sectional view taken from FIG. 3 along line 5 thereof;

FIGS. 4, 6 and 7 illustrate further variations of portable cart structures, particularly for permitting nesting.

Referring to FIG. 1, the checking system includes a counter generally designated as 10 which may be of any conventional construction and which is provided with a flat table surface 12 for checking and packaging the merchandise as it is unloaded from the cart. The counter also includes a stand 14 for supporting the cash register. The stand may be integral with the counter or a separate unit, but in either event it is considered part of the counter for purposes of this description.

Figure 2:
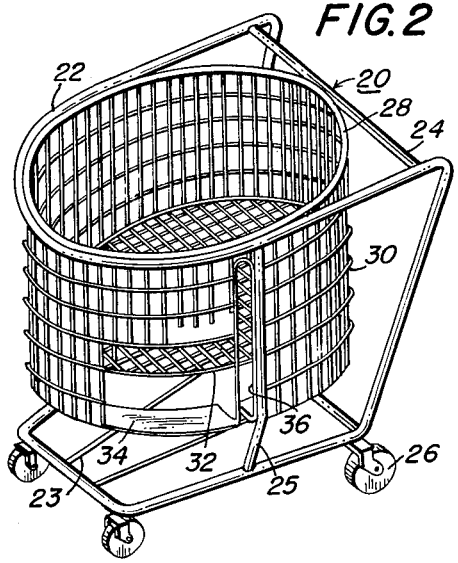
FIG. 2 illustrates a portable cart structure for use in the system of FIG. 1.

The cart 20 illustrated in FIG. 1 is also shown in FIG. 2 and comprises a frame structure 22 of metal tubing or the like formed with a lower platform or shelf 23 for carrying bulky articles, a handle bar 24, and a set of casters or wheels 26 for portability. The frame structure supports a basket 28 of a wire mesh, preferably circular in shape, including a cylindrical side wall 30, a bottom wall 32, and an open top. The cylindrical side wall contemplates one that may be tapered as hereinafter disclosed.

The bottom wall 32 is supported to permit relative vertical movement thereof with respect to the side wall 30 in a direction bringing the bottom wall towards and away from the open top, and is also supported to permit relative horizontal rotational movement thereof with respect to the frame structure 22 of the cart. For this purpose, the side wall 30 of the basket terminates at its lower end in an inwardly extending rim 34 upon which the bottom wall 32 may freely rest. Alternatively, the movable bottom wall 32 may rest on a rim extending across a greater area of the wall 32 so as to constitute a permanent bottom having an opening for accommodating a drive mechanism (not shown). In addition, one side of side wall 30 is formed with a vertically extending slot 36 also for accommodating the drive mechanism disclosed in our aforesaid parent application.

Figure 3:
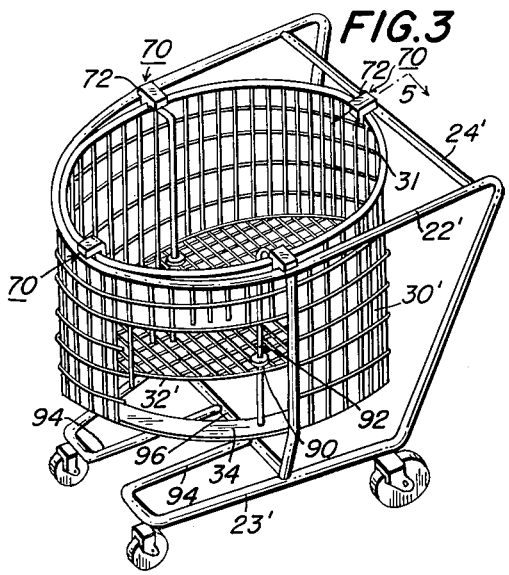
FIG. 3 illustrates a variation of the portable cart structure of FIG. 2.

In the portable carts illustrated in FIGS. 1 and 2, the basket side wall 30 is integrally connected to the cart frame structure 22, so that as the bottom 32 is moved in either the vertical and/or horizontal planes with respect to the frame structure, the basket side wall is prevented from moving therewith and remains stationary with the frame. The basket side wall 30 is also provided with a slot 36 and the frame is provided with a brace 25. FIG. 3, however, illustrates a variation of a portable cart wherein the basket side wall 30' is mounted for rotary movement with respect to the frame and is coupled to the bottom wall 32' for rotational movement therewith when the bottom wall is rotated with respect to the frame.

In the cart of FIG. 3, the basket is supported from the upper portion of the frame structure 22' by a plurality of supporting members 70 (four being shown) which permit the basket as a whole to be rotated in a horizontal plane with respect to the frame. FIG. 5 illustrates a sectional view of the supporting member at the handle 24' portion of the frame structure. As shown, each supporting member 70 includes a collar 72 fixedly secured to the handle 24', as by clamping or welding, the upper portion of the collar 72 being formed with an inwardly extending lip 74 carrying a pin 76 fixed thereto and a roller bearing element 78 rotatably mounted on the pin. The lower portion of the collar 72 carries another pin 80 fixed to the collar, on which pin is journalled a bearing wheel 82. The basket side walls have integrally formed thereon, or fixed thereto as by welding, an outwardly extending bead 31 circumscribing the outer periphery of the basket and which is positioned between bearing element 78 and bearing wheel 82 when the basket is assembled to the cart frame, the pin 80 and bearing 82 being slightly spaced from the basket side wall 30' so as to permit the basket to be rotated in a horizontal plane between bearings 78 and 82. It will, of course, be appreciated that other arrangements could be used for supporting the basket on the frame in a manner that will permit the basket as a whole to be rotated horizontally with respect to the frame.

The cart of FIG. 3 also includes an arrangement for coupling the bottom 32' of the basket with its side wall 30', so that as the bottom is rotated in a horizontal plane, with respect to the frame structure, it will also carry with it the side wall. For this purpose, the bottom 32' is formed with a plurality of apertures 90 along the outer margins thereof, and a strip of metal wire 92 or the like passes through each aperture and is fastened, at one end, to the inwardly extending rim 34 formed at the lower end of the basket side wall, and at the other end, to the bead 31 formed at the upper end of the side wall. The wires 92 are formed parallel to the side walls except at their upper ends where they are bent outwardly for securement to the bead 31. Thus, the bottom 32' of the basket is free to be moved vertically with respect to the side wall, being limited by rim 34 at its lower position and by the bent portions of the wires 92 at its upper position. However any rotational movement of the bottom wall 32' with respect to the frame will also cause the side wall to move therewith as permitted by supporting members 70, whereby the basket as a whole will be rotatable with respect to the frame structure.

Since, in the cart embodiment disclosed in FIG. 3 the whole basket is rotatable, the basket side wall 30' is not provided with the vertical slot 36 shown in FIGS. 1 and 2. For this purpose preferably, the lower platform 23' of the FIG. 3 frame structure is formed with two legs 94 spaced from each other to accommodate a vertical bracket or support for the rotatable disk 42 (FIG. 1), and also with a cross-bar 96 for engagement with the vertical support for this disk to thereby position the cart with respect to the drive mechanism.

Figure 4:
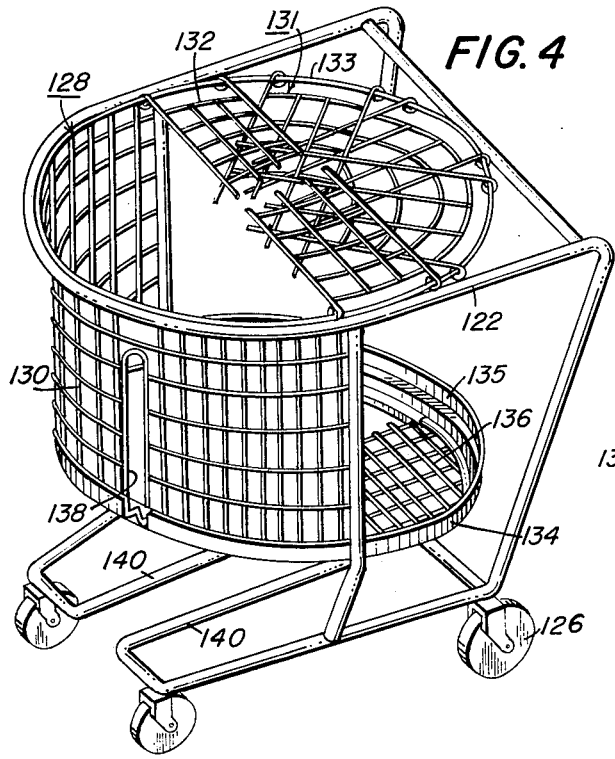
Figure 6:
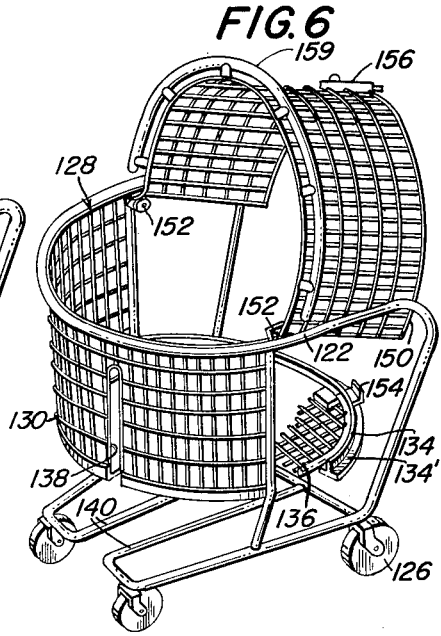

FIGS. 4, 6 and 7 illustrate various portable cart structures to permit nesting of any one cart in other carts of like structure. This is a fairly uniform characteristic of the portable carts used today in food markets in order to conserve floor space in the market while the carts are not being used.

In FIG. 4, the cart illustrated includes the frame structure 122 supported on wheels 126 similar to the carts heretofore described, except that the basket, herein designated as 128, has been modified to include the nesting feature. Here, the side wall is divided into two parts, one part 130 being fixedly supported in a vertical position, and the other parts 131 being made up of a plurality of sections 132 pivotally supported from the upper rim 133 of the basket. The lower rim 134 upon which the movable bottom wall 136 normally rests is formed with an upwardly extending border 135 adapted to be engaged by sections 132 when they assume their normal vertical positions while the cart is being used for carrying articles. Thus, in normal use, sections 132 are in their vertical positions against rim 134 and therefore provide, with part 130 of the side wall, a continuous enclosure for the articles. However, when the cart is empty, one cart may be nested with another cart of like structure, whereupon part 130 of the side wall of one cart pushes against, and thereby upwardly pivots sections 132 of the other cart. When the carts are separated, the sections automatically return to their normal vertical positions against rim 134. It will be appreciated that the bottom wall 136 and the rim 134 will be tilted downwardly at the portion of the basket underlying the pivotal sections 132 to permit the carts to nest without interference. It will also be appreciated that the cart of FIG. 4 could include the construction of either FIG. 2 or FIG. 3 for permitting movement of the bottom wall, alone or with the side wall, with respect to the frame structure. Under the FIG. 2 arrangement, rim 134 could be fixedly secured to either the frame and/or the side wall of the basket.

FIG. 4 also illustrates the vertical slot 138, for accommodating the drive mechanism of our aforesaid parent application, as being formed in the front of the side wall opposite to the handle for use with a drive mechanism disposed in the table 12 portion of the counter. Also, in FIG. 4 this platform of the cart structure is formed as two spaced legs, 140, should the cart be used with a drive arrangement suggested above in connection with the description of FIG. 3.

FIG. 6 illustrates another variation to permit nesting which is somewhat similar to that shown in FIG. 4, similar parts carrying like reference characters. The primary difference between the carts shown in FIGS. 4 and 6 resides in the structure and operation of the movable parts (131 of FIG. 4 and 150 of FIG. 6) of the basket side wall. In FIG. 6, this movable part is formed as a single section 150 pivotally mounted to a pair of studs 152 formed on the frame structure 122 (or the vertical part 130 of the basket side wall). During use, section 150 of the side wall is pivoted downwardly against rim 134 to form a continuous enclosing surface with vertical part 130 of the side wall. However, when the cart is to be nested with another, section 150 is pivoted 180° so that it lies on top of and in alignment with part 130 thereby forming a semi-circular surface which can be nested. Any suitable means can be used for retaining section 150 in place when it is in its normal downward position, such as a lug 154 formed on the lower rim 134 and a spring latch 156 carried at the lower end of the section 150. That portion of rim 134 underlying section 150 may be provided with a horizontally extending seating surface 134' for section 150. It will also be appreciated that the bottom wall 136 and the lower rim 134 would be likewise tilted, as in FIG. 4, to permit nesting. Preferably, in FIG. 6 the handle bar is omitted for nesting purposes, and the portion of the frame 159 encircling section 150 of the basket is used as the handle.

FIG. 7 illustrates a still further arrangement to permit nesting. Here the basket, generally designated as 160, is pivotally mounted on the frame structure by a pair of pivots 162 (one being shown), enabling the basket to be rotated 90° to occupy the position shown in dotted lines. In addition, the side wall of the basket is tapered, being of greater diameter at the top than at the bottom, so that during non-use of the cart, the basket may be pivoted to the position shown in dotted lines and telescoped in other carts of like structure. Any suitable means could be used for retaining the basket in either of its two positions such as the use of pivots 162 having two-position locking means. Any suitable means could be used for retaining the bottom in place when the basket is pivoted to its nesting position.

For simplification purposes, the structure permitting the bottom wall of the basket to be moved in the manner earlier described has not been shown in detail in the variations of FIGS. 4, 6 and 7 but it will be appreciated that these carts could utilize the arrangement disclosed in connection with either FIG. 2 or FIG. 3. Also, all the illustrations of the baskets show it made from a wire mesh or the like which in most cases would be preferred, as the baskets would thereby permit more ready viewing of their contents and would prevent an accumulation of foreign matter. However, these disclosures do not foreclose the use of other materials. For example, in the cart disclosed in FIG. 2 it may be preferable to make the basket bottom wall of the wire mesh, and the basket side wall of a material having a smoother surface, such as a transparent plastic, to prevent any binding or abrading action on the articles of merchandise as they are rotated by and with the bottom of the basket.

While the invention has been described and pointed out in connection with the foregoing disclosure of several preferred embodiments thereof, it is to be understood that since there are many other variations and modifications thereof which will become apparent to those skilled in the art and since there are many features thereof which could be used with or apart from other disclosed features, the invention itself is not to be limited except as defined in the following claims:

We claim:

1. A portable cart of the character described comprising a wheeled frame structure and a basket supported thereby for carrying articles, said basket having side wall means, a bottom wall and an open top, said bottom wall being supported to permit relative vertical movement thereof with respect to said side wall means between a first position adjacent to the bottom of said side wall means and a second position in proximity to the top of said side wall means, said bottom wall also being supported to permit relative horizontal rotational movement thereof with respect to said frame structure, said side wall means forming a substantially cylindrical enclosure terminating at its lower end in an inwardly extending rim and being rotatably supported on said cart frame structure to permit horizontal rotational movement thereof with respect to said frame structure, and said bottom wall being circular in shape and seated on said rim in said side wall means.

2. A portable cart of the character described comprising a wheeled frame structure and a basket supported thereby for carrying articles, said basket having side wall means, a bottom wall and an open top, said bottom wall being supported to permit relative vertical movement thereof with respect to side wall means between a first position adjacent to the bottom of said side wall means and a second position in proximity to the top of said side wall means, said bottom wall also being supported to permit relative horizontal rotational movement thereof with respect to said frame structure and said side wall means including a plurality of sections pivotally mounted at the open top of the basket, said sections forming at least one half of the enclosure formed by the side wall means when in their normal vertical positions but being pivotable to a horizontal position, and wherein said bottom wall is normally supported in a downwardly tilted position, whereby the cart will nest with other carts of like structure.

3. A portable cart of the character described comprising a wheeled frame structure and a basket supported thereby for carrying articles, said basket having side wall means, a bottom wall and an open top, said bottom wall being supported to permit relative vertical movement thereof with respect to said side wall means between a first position adjacent to the bottom of said side wall means and a second position in proximity to the top of said side wall means, said bottom wall to also be supported to permit relative horizontal rotational movement thereof with respect to said frame structure, said side wall means including a section extending at least one half of the enclosure formed by the side wall means, said section being pivotably mounted at the open top of the basket 180° from its normal position into alignment with the remainder of the sidewall means, said side wall means further including means for releasably retaining said portable section in its normal position, and wherein said bottom is supported in a downwardly tilted position whereby the cart will nest with other carts of like structure.

4. A portable cart of the character described comprising a wheel frame structure and the basket supported thereby for carrying articles, said basket having side wall means, a bottom wall and an open top, said bottom wall being supported to permit relative vertical movement thereof with respect to said side wall means between a first position adjacent to the bottom of said side wall means and a second position in proximity to the top of such side wall means, said bottom wall also being supported to permit relative horizontal rotational movement thereof with respect to said frame structure, said basket being pivotably mounted on said frame structure, and said side wall means being tapered from the bottom thereof to the top whereby the cart will nest with other carts of like structure.

References Cited by the Examiner

UNITED STATES PATENTS

| | | | |
|---|---|---|---|
| 464,533 | 12/1891 | Taylor. | |
| 2,605,116 | 7/1952 | Alexander | 280—33.99 |
| 2,630,243 | 3/1953 | Longstreet | 220—93 |
| 2,766,049 | 10/1956 | Just et al. | 280—33.99 |
| 2,812,187 | 11/1957 | Nicholl et al. | 280—33.99 |
| 2,958,536 | 11/1960 | Young | 280—33.99 |

FOREIGN PATENTS 1,027,679  2/1953  France.

BENJAMIN HERSH, *Primary Examiner.*

PHILIP ARNOLD, A. HARRY LEVY, *Examiners.*